(12) United States Patent
Ebuchi et al.

(10) Patent No.: US 11,242,914 B2
(45) Date of Patent: Feb. 8, 2022

(54) POWER TRANSMISSION UNIT

(71) Applicant: TOYOTA JIDOSHA KABUSHIKI KAISHA, Toyota (JP)

(72) Inventors: Hiroaki Ebuchi, Hadano (JP); Yoichiro Isami, Mishima (JP); Hirotsugu Yoshino, Sunto-gun (JP); Hiroki Yasui, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/136,719

(22) Filed: Dec. 29, 2020

(65) Prior Publication Data
US 2021/0222757 A1    Jul. 22, 2021

(30) Foreign Application Priority Data
Jan. 22, 2020 (JP) .............................. JP2020-008318

(51) Int. Cl.
*F16H 3/72* (2006.01)
*F16H 3/00* (2006.01)
*F16H 57/021* (2012.01)
*F16H 3/76* (2006.01)

(52) U.S. Cl.
CPC ............... *F16H 3/006* (2013.01); *F16H 3/76* (2013.01); *F16H 57/021* (2013.01); *F16H 2200/2035* (2013.01)

(58) Field of Classification Search
CPC . F16H 3/006; F16H 3/62; F16H 3/725; F16H 3/76; F16H 57/021; F16H 2200/2007; F16H 2200/2035; F16H 2200/2038; F16D 11/00–16; F16D 21/00–08
See application file for complete search history.

(56) References Cited

U.S. PATENT DOCUMENTS

| 4,084,673 A * | 4/1978 | Clements ................ F16D 23/10 192/48.92 |
| 5,908,080 A * | 6/1999 | Bigley ............... B60K 17/3515 180/247 |
| 7,607,523 B2 * | 10/2009 | Clemens ................. F16D 11/14 192/69.9 |
| 10,557,537 B2 * | 2/2020 | Keeney ................. F16H 37/082 |
| 2019/0143962 A1 | 5/2019 | Imamura et al. |

FOREIGN PATENT DOCUMENTS

JP   2019-089413 A   6/2019

* cited by examiner

*Primary Examiner* — Huan Le
(74) *Attorney, Agent, or Firm* — Oliff PLC

(57) ABSTRACT

A power transmission unit that can prevent unintentional disengagement of a clutch. A first set of teeth formed on an outer circumferential surface of a first rotary member is engaged with a third set of teeth formed on an inner circumferential surface of a second rotary member. A second set of teeth formed on an inner circumferential surface of the first rotary member is meshed with a fourth set of teeth formed on an outer circumferential surface of a third rotary member. A center of engagement between the first set of teeth and the third set of teeth is situated at a point withdrawn from a center of engagement between the second set of teeth and the fourth set of teeth in the direction to disengage the first set of teeth from the third set of teeth.

7 Claims, 10 Drawing Sheets

FIG. 2

| OPERATING MODE | | CL1 | CL2 | B1 | MG1 | MG2 | ENG |
|---|---|---|---|---|---|---|---|
| HV MODE | HV-Low MODE | ● | – | – | G | M | ON |
| | HV-High MODE | – | ● | – | G | M | ON |
| | FIXED MODE | ● | ● | – | | | ON |
| EV MODE | DUAL-MOTOR MODE — EV-Low MODE | – | – | ● | M | M | OFF |
| | DUAL-MOTOR MODE — EV-High MODE | – | ● | ● | M | M | OFF |
| | SINGLE-MOTOR MODE | – | – | – | | M | OFF |

POWER TRANSMISSION UNIT

CROSS-REFERENCE TO RELATED APPLICATIONS

The present disclosure claims the benefit of Japanese Patent Application No. 2020-008318 filed on Jan. 22, 2020 with the Japanese Patent Office, the disclosures of which are incorporated herein by reference in its entirety.

BACKGROUND

Field of the Disclosure

Embodiments of the present disclosure relates to the art of a power transmission unit comprising a dog clutch.

Discussion of the Related Art

JP-A-2019-089413 describes a hybrid drive unit in which an operating mode is shifted among a plurality of modes by manipulating a plurality of clutches. The hybrid drive unit taught by JP-A-2019-089413 comprises: a prime mover including an engine, a first motor and a second motor; and a power split mechanism comprising a plurality of planetary gear unit. In the power split mechanism, an output element (i.e., a ring gear) of a first planetary gear unit connected to the engine and the first motor is connected to a reaction element (i.e., a sun gear) of a second planetary gear unit, and an output element (i.e., a ring ger) of the second planetary gear unit is connected to an output gear. The power split mechanism comprises a first clutch as a dog clutch that is engaged to connect an input element of the second planetary gear unit to the engine or an input element of the first planetary gear unit, and a second clutch as a dog clutch that is engaged to rotate the rotary elements of the second planetary gear unit integrally. In the hybrid drive unit taught by JP-A-2019-089413, a speed of the engine can be changed by changing a speed of the first motor while engaging any one of the first clutch and the second clutch. That is, the power split mechanism serves as a continuously variable transmission, and a speed ratio between speeds of the engine and the output member may be varied continuously by changing a speed of the first motor. In the hybrid drive unit taught by JP-A-2019-089413, specifically, HV-Low mode is established by engaging the first clutch, and HV-High mode is established by engaging the second clutch. In the HV-High mode, a ratio of torque of the engine delivered to the output member is smaller than that in the HV-Low mode.

As described, in the hybrid drive unit taught by JP-A-2019-089413, the dog clutch is adopted as the first clutch and the second clutch respectively. Specifically, in the second clutch, external teeth (i.e., dog teeth) are meshed with the ring gear of the second planetary gear unit, and internal teeth (i.e., spline teeth) are meshed with the carrier of the second planetary gear unit. On the other hand, the ring gear of the second planetary gear unit is also meshed with a driven gear fitted onto a countershaft. In the hybrid drive unit taught by JP-A-2019-089413, a helical gear in which teeth are set at a predetermined angle with respect to a rotational center axis is adopted as each gear of power split mechanism. Therefore, the ring gear and the driven gear meshing with each other are subjected to a reaction force to be isolated from each other. Consequently, the ring gear is rotated eccentrically with respect to a carrier shaft and a meshing load applied to the second clutch is changed. In this situation, if the ring gear and the carrier eccentrically engaged with each other are rotated continuously, the dog teeth of the second clutch may be disengaged unintentionally from the carrier.

SUMMARY

Aspects of the present disclosure have been conceived noting the foregoing technical problems, and it is therefore an object of the present disclosure to provide a power transmission unit that can prevent unintentional disengagement of dog teeth by a simple structure.

The power transmission unit according to the exemplary embodiment of the present disclosure comprises: a cylindrical first rotary member; a cylindrical second rotary member that is diametrically larger than the first rotary member, and that is arranged concentrically with the first rotary member; a cylindrical third rotary member that is diametrically smaller than the first rotary member, and that is arranged concentrically with the first rotary member; a first engagement device including the second rotary member; a first set of teeth that is formed on an outer circumferential surface of the first rotary member; a second set of teeth that is formed on an inner circumferential surface of the first rotary member; a third set of teeth that is formed on an inner circumferential surface of the second rotary member to be meshed with the first set of teeth; and a fourth set of teeth that is formed on an outer circumferential surface of the third rotary member to be meshed with the second set of teeth. The first rotary member is reciprocated in an axial direction to engage and disengage the first set of teeth to/from the third set of teeth thereby engaging and disengaging the first engagement device. In order to achieve the above-explained objective, according to the exemplary embodiment of the present disclosure, a center of engagement between the first set of teeth and the third set of teeth is situated at a point withdrawn from a center of engagement between the second set of teeth and the fourth set of teeth in a direction to disengage the first set of teeth from the third set of teeth.

In a non-limiting embodiment, the second rotary member may be connected to a fourth rotary member mounted on a shaft other than a shaft of the second rotary member in a torque transmittable manner.

In a non-limiting embodiment, the second rotary member may be rotatably supported by a bearing interposed between a casing of the power transmission unit and the second rotary member.

In a non-limiting embodiment, the first rotary member may include a pushing member expanding from one end of the first rotary member, and the first set of teeth may be engaged with the third set of teeth by pushing the first rotary member by the pushing member.

In a non-limiting embodiment, the first rotary member and the third rotary member may be always engaged with each other to rotate integrally.

In a non-limiting embodiment, a prime mover of the power transmission unit may comprise an engine, a first motor, and a second motor. The power transmission unit may comprise: a first differential mechanism that performs a differential action among a first rotary element that is connected to the engine, a second rotary element that is connected to the first motor, and a third rotary element that delivers torque to drive wheels; and a second differential mechanism that performs a differential action among a fourth rotary element that is connected to the second motor, a fifth rotary element that is connected to the third rotary element, and a sixth rotary element. The second rotary member may be rotated integrally with the fourth rotary element, the third rotary member may be rotated integrally with the sixth rotary element, and the first engagement device may selectively connect the fourth rotary element to the sixth rotary element.

In a non-limiting embodiment, the power transmission unit may further comprise: an input member; an output member that outputs torque delivered from the input member; and a second engagement device that selectively connects the sixth rotary element to the first rotary element. The first engagement device may be engaged to establish a first continuously variable mode in which a speed ratio between the input member and the output member can be varied continuously. On the other hand, the second engagement device may be engaged to establish a second continuously variable mode in which a speed ratio between the input member and the output member can be varied continuously, and in which a toque amplification factor is different from the first continuously variable mode.

Thus, according to the exemplary embodiment of the present disclosure, the center of engagement between the first set of teeth and the third set of teeth is situated at the point withdrawn from the center of engagement between the second set of teeth and the fourth set of teeth in the direction to disengage the first set of teeth from the third set of teeth. The first set of teeth formed on the outer circumferential surface of the first rotary member is engaged with the third set of teeth formed on the inner circumferential surface of the second rotary member, and the second rotary member is connected to the fourth rotary member mounted on the shaft other than the shaft of the second rotary member. According to the exemplary embodiment of the present disclosure, therefore, the second rotary member is subjected to a moment to be inclined in a direction push the third set of teeth onto the first set of teeth during operation while engaging the first clutch. For this reason, unintentional disengagement of the first set of teeth from the third set of teeth can be prevented.

In addition, according to the exemplary embodiment of the present disclosure, unintentional disengagement of the first clutch can be prevented without requiring an additional member such as an actuator. That is, according to the exemplary embodiment of the present disclosure, unintentional disengagement of the first clutch can be prevented without increasing a manufacturing cost and a size of the differential mechanism.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 2 is a table showing engagement states of engagement devices and operating conditions of the prime movers in each operating mode;

DETAILED DESCRIPTION OF THE PREFERRED EMBODIMENT(S)

Figure 1:
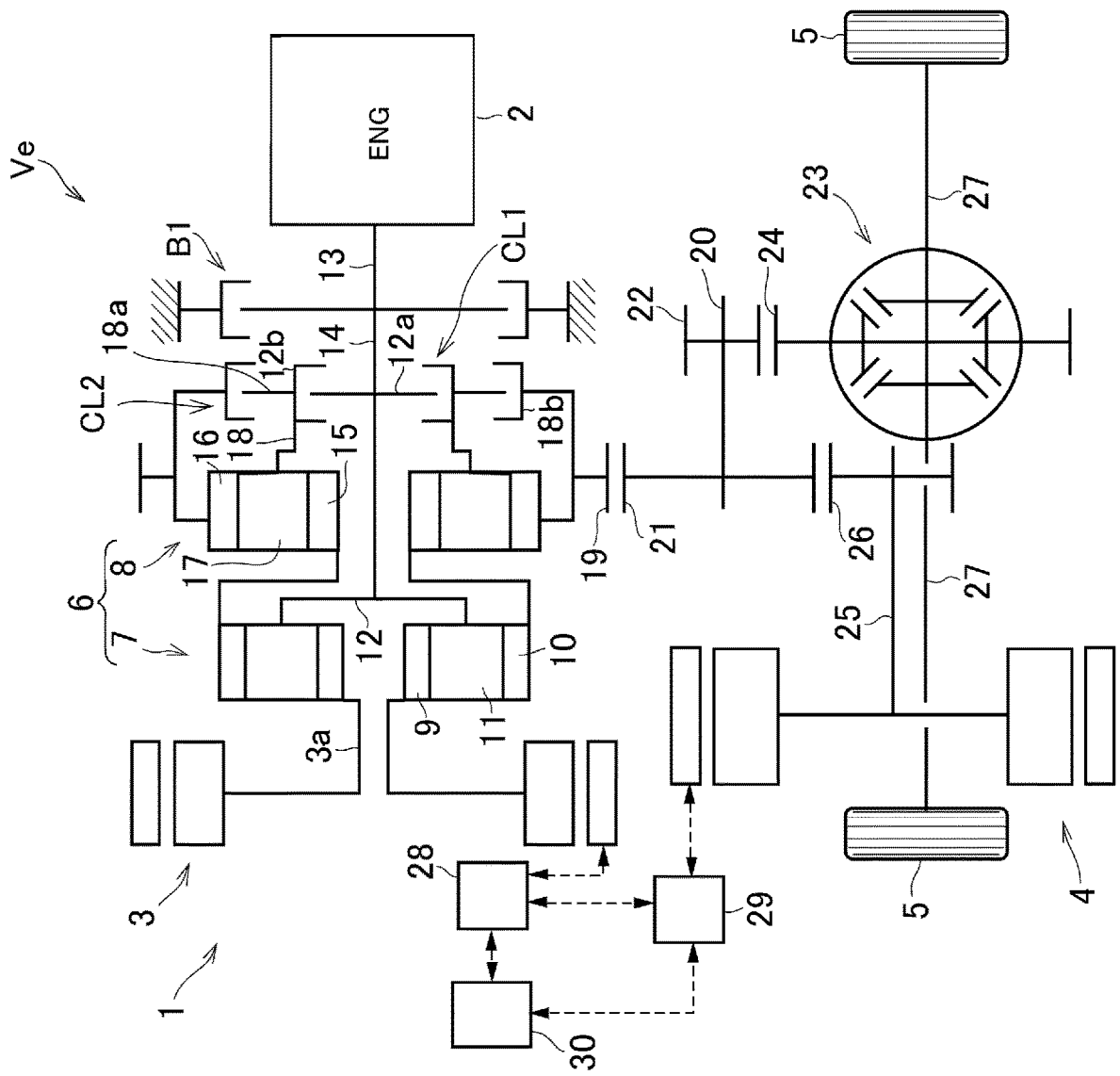
FIG. 1 is a skeleton diagram schematically showing one example of a structure of a power transmission unit according to the exemplary embodiment of the present disclosure.

Preferred embodiments of the present disclosure will now be explained with reference to the accompanying drawings. Referring now to FIG. 1 there is shown one example of a structure of a power transmission unit 1 of a hybrid vehicle (as will be simply called the "vehicle" hereinafter) Ve. A prime mover of the power transmission unit 1 includes an engine (referred to as "ENG" in the drawings) 2, a first motor (referred to as "MG1" in the drawings) 3, and a second motor (referred to as "MG2" in FIG. 1 the drawings) 4. For example, a permanent magnet synchronous motor having a generating function (i.e., a motor-generator) may be adopted as the first motor 3 and the second motor 4, respectively. In the power transmission unit 1, a speed of the engine 2 may be changed by controlling the first motor 3. An electric power generated by the first motor 3 may be supplied to the second motor 4 to operate the second motor 4 as a motor, and the vehicle Ve may be propelled by a torque generated by the second motor 4.

In the power transmission unit 1, an output power of the engine 2 is delivered to a pair of drive wheels 5 without being translated to an electric power, or while being translated to an electric power. Otherwise, the drive wheels 5 may also be driven by the first motor 3 and the second motor 4. To this end, a power split mechanism 6 is connected to the engine 2. The power split mechanism 6 includes a power split section 7 that distributes the output torque of the engine 2 to the first motor 3 side and to an output side, and a transmission section 8 that alters a torque split ratio of the power split section 7.

A single-pinion planetary gear unit adapted to perform differential action among three rotary elements is adopted as the power split section 7. Accordingly, the power split section 7 serves as a first differential mechanism of the embodiment. Specifically, the power split section 7 comprises: a sun gear 9; a ring gear 10 as an internal gear arranged concentrically around the sun gear 9; a plurality of pinion gears 11 interposed between the sun gear 9 and the ring gear 10 while being meshed with both gears 9 and 10; and a carrier 12 supporting the pinion gears 11 in a rotatable manner. In the power split mechanism 6, accordingly, the carrier 12 serves as a first rotary element, the sun gear 9 serves as a second rotary element, and the ring gear 10 serves as a third rotary element.

An output shaft 13 of the engine 2 is connected to an input shaft 14 as an input member of the power split mechanism 6 connected to the carrier 12 so that the output power of the engine 2 is applied to the carrier 12. Optionally, an additional gear unit (not shown) may be interposed between the input shaft 14 and the carrier 12, and a damper device and a torque converter (neither of which are shown) may be interposed between the output shaft 13 and the input shaft 14.

The sun gear 9 is connected to the first motor 3. In the power transmission unit 1 shown in FIG. 1, the power split section 7 and the first motor 3 are arranged concentrically with a rotational center axis of the engine 2, and the first motor 3 is situated on an opposite side of the engine 2 across the power split section 7. The transmission section 8 is interposed coaxially between the power split section 7 and the engine 2.

The transmission section 8 is also a single-pinion planetary gear unit comprising: a sun gear 15; a ring gear 16 as an internal gear arranged concentrically around the sun gear 15; plurality of pinion gears 17 interposed between the sun gear 15 and the ring gear 16 while being meshed with both gears 17 and 18; and a carrier 18 supporting the pinion gears 17 in a rotatable manner. Thus, the transmission section 8 is also adapted to perform a differential action among the sun gear 15, the ring gear 16, and the carrier 18. Accordingly, the transmission section 8 serves as a second differential mechanism of the embodiment. In the transmission section 8, the sun gear 15 is connected to the ring gear 10 of the power split section 7, and the ring gear 16 is connected to an output gear 19 serving as an output member. In the power split mechanism 6, accordingly, the ring gear 16 serves as a fourth rotary element, the sun gear 15 serves as a fifth rotary element, and the carrier 18 serves as a sixth rotary element.

In order to use the power split section 7 and the transmission section 8 as a complex planetary gear unit, a first clutch CL1 as a second engagement device of the embodiment is disposed to selectively connect the carrier 18 of the transmission section 8 to the carrier 12 of the power split section 7 connected to the input shaft 14. The first clutch CL1 includes a pair of engagement elements 12a and 12b selectively engaged to each other to transmit torque. Specifically, the input element 12a is fitted onto the input shaft 14, and the output element 12b is connected to the carrier 18 of the transmission section 8. For example, a friction clutch such as wet-type multiple plate clutch, and a dog clutch may be adopted as the first clutch CL1. In the power transmission unit 1 shown in FIG. 1, a dog clutch is employed as the first clutch CL1. Thus, in the power transmission unit 1 shown in FIG. 1, the power split section 7 is connected to the transmission section 8 to serve as a complex planetary gear unit by engaging the first clutch CL1. In the complex planetary gear unit thus formed, the carrier 12 of the power split section 7 is connected to the carrier 18 of the transmission section 8 to serve as an input element, the sun gear 9 of the power split section 7 serves as a reaction element, and the ring gear 16 of the transmission section 8 serves as an output element. That is, the complex planetary gear unit is configured such that the input shaft 14, an output shaft 3a of the first motor 3, and an after-mentioned driven gear 21 are allowed to rotate in a differential manner.

A second clutch CL2 as a first engagement device of the embodiment is disposed to rotate the rotary elements of the transmission section 8 integrally. For example, a friction clutch such as wet-type multiple plate clutch, and a dog clutch may also be adopted as the second clutch CL2. In the power transmission unit 1 shown in FIG. 1, a dog clutch is also adopted as the second clutch CL2 to selectively connect the carrier 18 to the ring gear 16 or the sun gear 15, or to connect the sun gear 15 to the ring gear 16. In the transmission unit 1 shown in FIG. 1, specifically, the second clutch CL2 is engaged to connect the carrier 18 to the ring gear 16. The second clutch CL2 includes a pair of engagement elements 18a and 18b selectively engaged to each other to transmit torque. Specifically, the input element 18a is connected to the carrier 18 of the transmission section 8, and the output element 18b is connected to the ring gear 16 of the transmission section 8.

A counter shaft 20 extends parallel to a common rotational axis of the engine 2, the power split section 7, and the transmission section 8. The driven gear 21 is fitted onto one end of the counter shaft 20 to be meshed with the output gear 19, and a drive gear 22 is fitted onto the other end of the counter shaft 20 to be meshed with a ring gear 24 of a differential gear unit 23 as a final reduction unit. The driven gear 21 is also meshed with a drive gear 26 fitted onto a rotor shaft 25 of the second motor 4 so that power or torque of the second motor 4 is synthesized with power or torque of the output gear 19 at the driven gear 21 to be distributed from the differential gear unit 23 to the drive wheels 5 via each driveshaft 27.

In order to selectively stop a rotation of the engine 2 when operating the first motor 3 as a motor to propel the vehicle Ve, a brake B1 as a third engagement device is arranged in the transmission unit 1. For example, a frictional engagement device or a dog brake may be adopted as the brake B1, and the brake B1 is fixed to a predetermined stationary member in radially outer side of the output shaft 13 or the input shaft 14. The carrier 12 of the power split section 7 and the carrier 18 of the transmission section 8 are allowed to serve as reaction elements, and the sun gear 9 of the power split section 7 is allowed to serve as an input element by applying the brake B1 to halt the output shaft 13 or the input shaft 14. To this end, the brake B1 may be adapted to stop the rotation of the output shaft 13 or the input shaft 14 not only completely but also incompletely to apply a reaction torque to those shafts. Alternatively, a one-way clutch may be used instead of the brake B1 to restrict a reverse rotation of the output shaft 13 or the input shaft 14.

A first power control system 28 is connected to the first motor 3, and a second power control system 29 is connected to the second motor. Each of the first power control system 28 and the second power control system 29 includes an inverter and a converter, respectively. The first power control system 28 and the second power control system 29 are connected to each other, and also connected individually to an electric storage device 30 including a lithium ion battery, a capacitor, and a solid-state battery. For example, when the first motor 3 is operated as a generator while establishing a reaction torque, an electric power generated by the first motor 3 may be supplied directly to the second motor 4 without passing through the electric storage device 30.

In the vehicle Ve, an operating mode may be selected from a hybrid mode (to be abbreviated as the "HV mode" hereinafter) in which the vehicle Ve is propelled by a drive torque generated by the engine 2, and an electric vehicle mode (to be abbreviated as the "EV mode" hereinafter) in which the vehicle Ve is propelled by drive torques generated by the first motor 3 and the second motor 4 without using the engine 2. The HV mode may be selected from a Hybrid-Low mode (to be abbreviated as the "HV-Low mode" hereinafter), a Hybrid-High mode (to be abbreviated as the "HV-High mode" hereinafter), and a fixed mode. Specifically, in the HV-Low mode, the engine 2 (i.e., a rotational speed of the input shaft 14) is rotated at a speed higher than a rotational speed of the ring gear 16 of the transmission section 8 when a rotational speed of the first motor 3 is reduced to substantially zero. In turn, in the HV-High mode, a rotational speed of the engine 2 is reduced lower than a rotational speed of the ring gear 16 of the transmission section 8 when a rotational speed of the first motor 3 is reduced to substantially zero. Further, in the fixed mode, the engine 2 and the ring gear 16 of the transmission section 8 are always rotated at substantially same speeds. Here, it is to be noted that a toque amplification factor in the HV-Low mode is greater than that in the HV-High mode.

The EV mode may be selected from a dual-motor mode in which both of the first motor 3 and the second motor 4 generate drive torques to propel the vehicle Ve, and a single-motor mode (or a disconnecting mode) in which only the second motor 4 generates a drive torque to propel the vehicle Ve. Further, the dual-motor mode may be selected from an Electric Vehicle-Low mode (to be abbreviated as the "EV-Low mode" hereinafter) in which a torque of the first motor 3 is multiplied by a relatively larger factor, and an Electric Vehicle-High mode (to be abbreviated as the "EV-High mode" hereinafter) in which a torque of the first motor 3 is multiplied by a relatively smaller factor. In the single-motor mode, the vehicle Ve is powered only by the second motor 4 while disengaging both of the first clutch CL1 and the second clutch CL2. Optionally, in the single-motor mode, one of the first clutch CL1 and the second clutch CL2 may be engaged according to need.

FIG. 2 shows engagement states of the first clutch CL1, the second clutch CL2, and the brake B1, and operating conditions of the first motor 3, the second motor 4, and the engine 2 in each operating mode. In FIG. 2, "●" represents that the engagement device is in engagement, "-" represents that the engagement device is in disengagement, "G" represents that the motor serves mainly as a generator, "M" represents that the motor serves mainly as a motor, blank represents that the motor serves as neither a motor nor a generator or that the motor is not involved in propulsion of the vehicle Ve, "ON" represents that the engine 2 generates a drive torque, and "OFF" represents that the engine 2 does not generate a drive torque.

Rotational speeds of the rotary elements of the power split mechanism 6, and directions of torques of the engine 2, the first motor 3, and the second motor 4 in each operating mode are indicated in FIGS. 3 to 8. In the nomographic diagrams shown in FIGS. 3 to 8, distances among the vertical lines represents a gear ratio of the power split mechanism 6, a vertical distance on the vertical line from the horizontal base line represents a rotational speed of the rotary member, an orientation of the arrow represents a direction of the torque, and a length of the arrow represents a magnitude of the torque.

Figure 3:
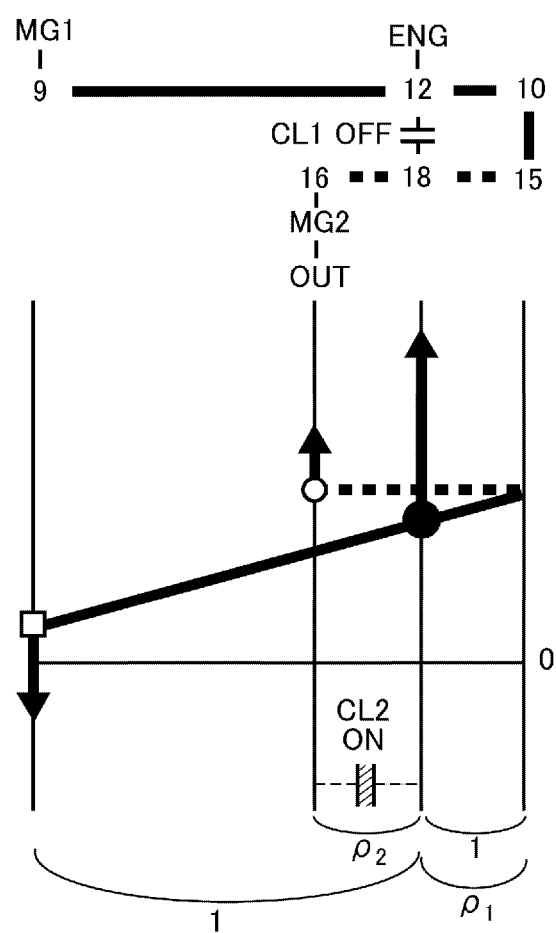
FIG. 3 is a nomographic diagram showing a situation in a HV-High mode.
Figure 4:
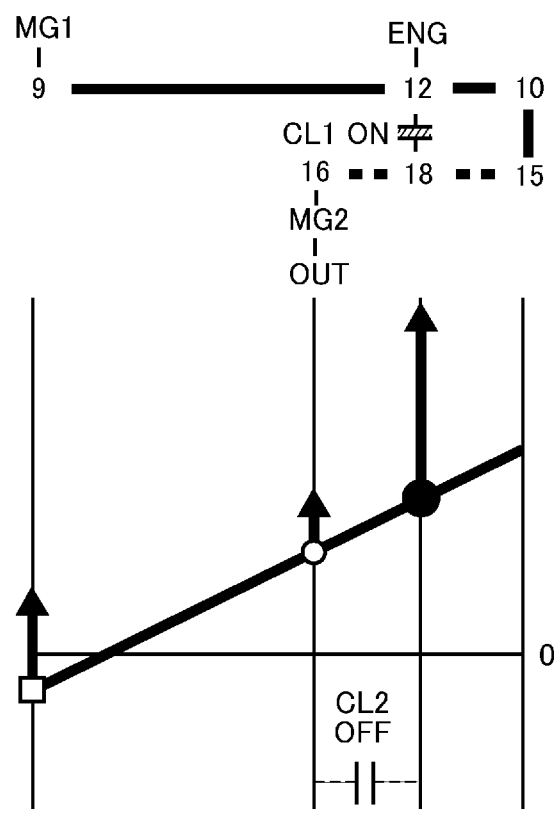
FIG. 4 is a nomographic diagram showing a situation in a HV-Low mode.

As indicated in FIG. 3, in the HV-High mode, the second clutch CL2 is engaged, and the engine 2 generates a drive torque while establishing a reaction torque by the first motor 3. As indicated in FIG. 4, in the HV-Low mode, the first clutch CL1 is engaged, and the engine 2 generates a drive torque while establishing a reaction torque by the first motor 3. In the HV-High mode and the HV-Low mode, a rotational speed of the first motor 3 is controlled in such a manner as to optimize a total energy efficiency in the power transmission unit 1 including a fuel efficiency of the engine 2 and a driving efficiency of the first motor 3. Specifically, the total energy efficiency in the transmission unit 1 may be calculated by dividing a total energy consumption by a power to rotate the front wheels as the drive wheels 5. A rotational speed of the first motor 3 may be varied continuously, and the rotational speed of the engine 2 is governed by the rotational speed of the first motor 3 and a speed of the vehicle Ve. That is, the power split mechanism 6 may serve as a continuously variable transmission.

As a result of establishing a reaction torque by the first motor 3, the first motor 3 serves as a generator. In this situation, therefore, a power of the engine 2 is partially translated into an electric energy by the first motor 3, and the remaining power of the engine 2 is delivered to the ring gear 16 of the transmission section 8. Specifically, the reaction torque established by the first motor 3 is governed by a split ratio of the torque delivered from the engine 2 to the first motor 3 side through the power split mechanism 6. Such split ratio between the torque delivered from the engine 2 to the first motor 3 side through the power split mechanism 6 and the torque delivered from the engine 2 to the ring gear 16 differs between the HV-Low mode and the HV-High mode.

Given that the torque delivered to the first motor 3 side is "1", a ratio of the torque applied to the ring gear 16 in the HV-Low mode may be expressed as "$1/(\rho 1 \cdot \rho 2)$", and a ratio of the torque applied to the ring gear 16 in the HV-High mode may be expressed as "$1/(\rho 1)$". In other words, given that the torque of the engine 2 is "1", a ratio of the torque of the engine 2 delivered to the ring gear 16 in the HV-Low mode may be expressed as "$1/(1-(\rho 1 \cdot \rho 2))$", and a ratio of the torque of the engine 2 delivered to the ring gear 16 in the HV-High mode may be expressed as "$1/(\rho 1+1)$". In the above expressions, "$\rho 1$" is a gear ratio of the power split section 7 (i.e., a ratio between teeth number of the ring gear 10 and teeth number of the sun gear 9), and "$\rho 2$" is a gear ratio of the transmission section 8 (i.e., a ratio between teeth number of the ring gear 16 and teeth number of the sun gear 15). Specifically, "$\rho 1$" and "$\rho 2$" are smaller than "1", respectively. That is, in the HV-Low mode, a ratio of the torque delivered to the ring gear 16 is increased in comparison with that in the HV-High mode.

Here, when the speed of the engine 2 is increased in the HV mode by the torque generated by the engine 2, the output torque of the engine 2 is reduced by a torque required to increase the speed of the engine 2. In the HV mode, the electric power generated by the first motor 3 is supplied to the second motor 4, and in addition, the electric power accumulated in the electric storage device 30 is also supplied to the second motor 4 as necessary.

Figure 5:
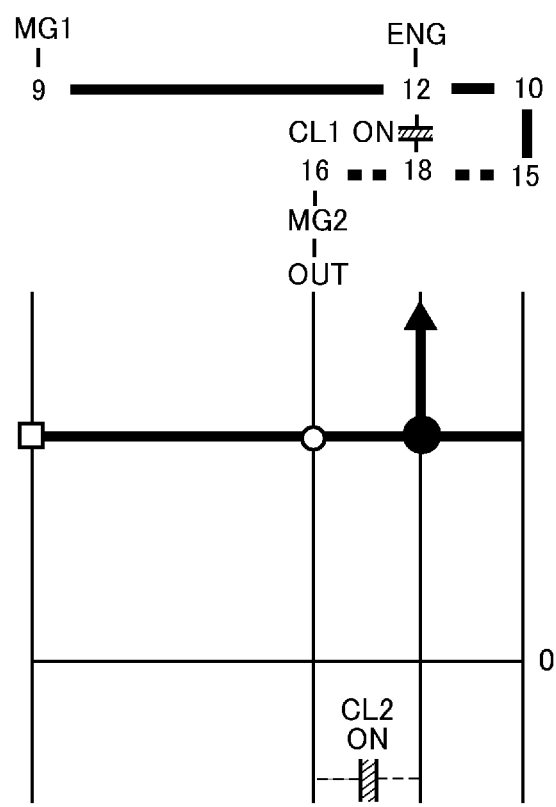
FIG. 5 is a nomographic diagram showing a situation in a fixed mode.

In the fixed mode, as indicated in FIG. 5, both of the first clutch CL1 and the second clutch CL2 are engaged so that all of the rotary elements in the power split mechanism 6 are rotated at a same speed. In other words, the output power of the engine 2 will not be translated into an electric energy by the first motor 3 and the second motor 4. For this reason, a power loss associated with such energy conversion will not be caused in the fixed mode and hence power transmission efficiency can be improved.

Figure 6:
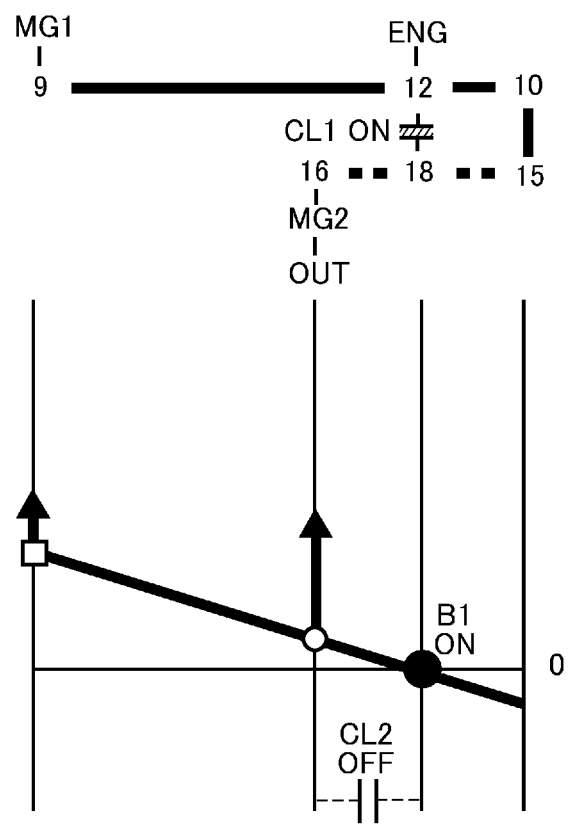
FIG. 6 is a nomographic diagram showing a situation in an EV-Low mode.
Figure 7:
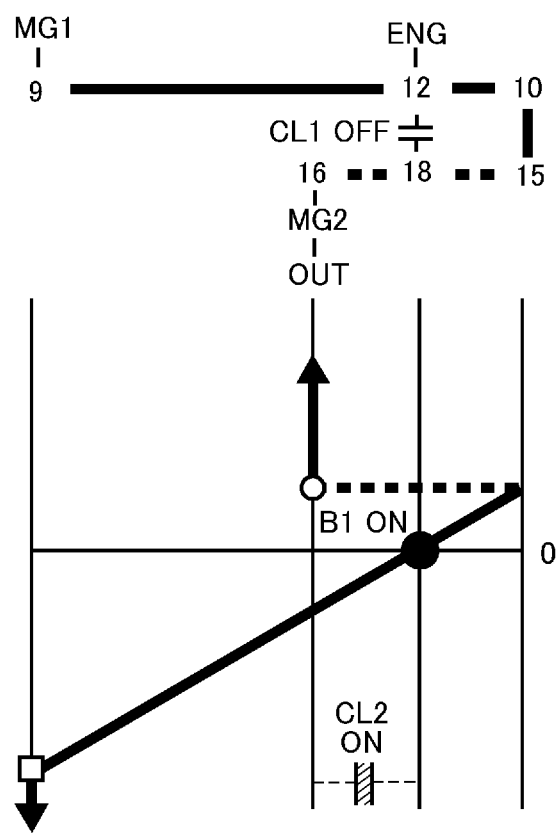
FIG. 7 is a nomographic diagram showing a situation in an EV-High mode.

As indicated in FIGS. 6 and 7, in the EV-Low mode and the EV-High mode, the brake B1 is engaged, and the first motor 3 and the second motor 4 generate drive torques to propel the vehicle Ve. As indicated in FIG. 6, in the EV-Low mode, the vehicle Ve is propelled by the drive torques generated by the first motor 3 and the second motor 4 while engaging the brake B1 and the first clutch CL1. In this case, the brake B1 establishes a reaction torque to restrict a rotation of the output shaft 13 or the carrier 12. In the EV-Low mode, the first motor 3 is rotated in the forward direction while generating torque in a direction to increase a rotational speed thereof. As indicated in FIG. 7, in the EV-High mode, the vehicle Ve is propelled by drive torques generated by the first motor 3 and the second motor 4 while engaging the brake B1 and the second clutch CL2. In this case, the brake B1 also establishes a reaction torque to restrict a rotation of the output shaft 13 or the carrier 12. In the EV-High mode, the first motor 3 is rotated in the opposite direction (i.e., in a reverse direction) to the rotational direction of the engine 2 in the HV mode, while generating torque in a direction to increase a rotational speed.

Figure 8:
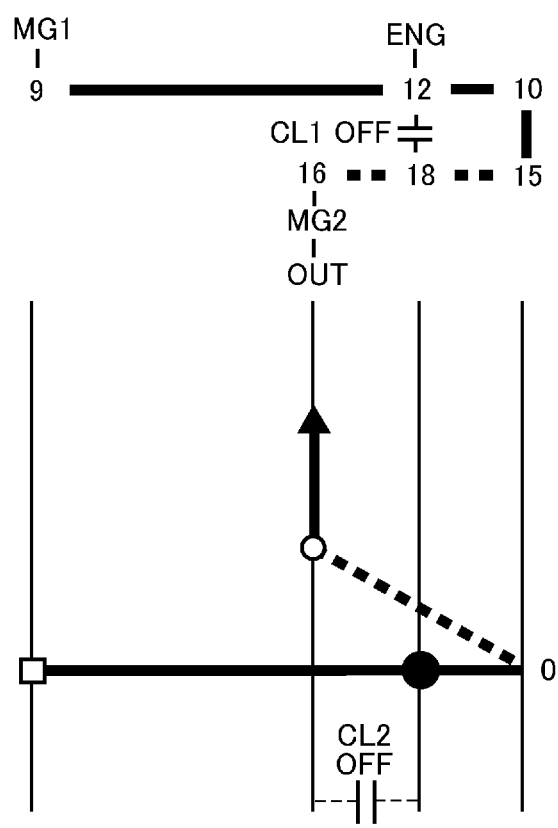
FIG. 8 is a nomographic diagram showing a situation in a single-motor mode.

In the EV-Low mode, a ratio of a rotational speed of the ring gear 16 of the transmission section 8 to a rotational speed of the first motor 3 is reduced smaller than that in the EV-High mode. That is, in the EV-Low mode, the rotational speed of the first motor 3 at a predetermined speed is increased higher than that in the EV-High mode. In other words, a speed reducing ratio in the EV-Low mode is greater than that in the EV-High mode. In the EV-Low mode, therefore, a larger drive force may be generated. Here, in the power transmission unit 1 shown in FIG. 1, the rotational speed of the ring gear 16 corresponds to a rotational speed of the output member, and the following explanation will be made on the assumption that a gear ratio among each member from the ring gear 16 to the drive wheels 5 is "1" for the sake of convenience. As indicated in FIG. 8, in the single-motor mode, only the second motor 4 generates a drive torque, and both of the first clutch CL1 and the second clutch CL2 are disengaged. In the single-motor mode, therefore, all of the rotary elements of the power split mechanism 6 are stopped. For this reason, the engine 2 and the first motor 3 will not be rotated passively, and hence the power loss can be reduced. Accordingly, the operating modes established by engaging the second clutch CL2 correspond to a "first continuously variable mode" of the embodiment of the present disclosure, and the operating modes established by engaging the first clutch CL1 correspond to a "second continuously variable mode" of the embodiment of the present disclosure.

In the power transmission unit 1 according to the exemplary embodiment of the present disclosure, the first clutch CL1 and the second clutch CL2 are arranged in such a manner that unintentional disengagement of the first clutch CL1 and the second clutch CL2. Structures of the first clutch CL1 and the second clutch CL2 are shown in FIG. 9 in detail.

Figure 9:
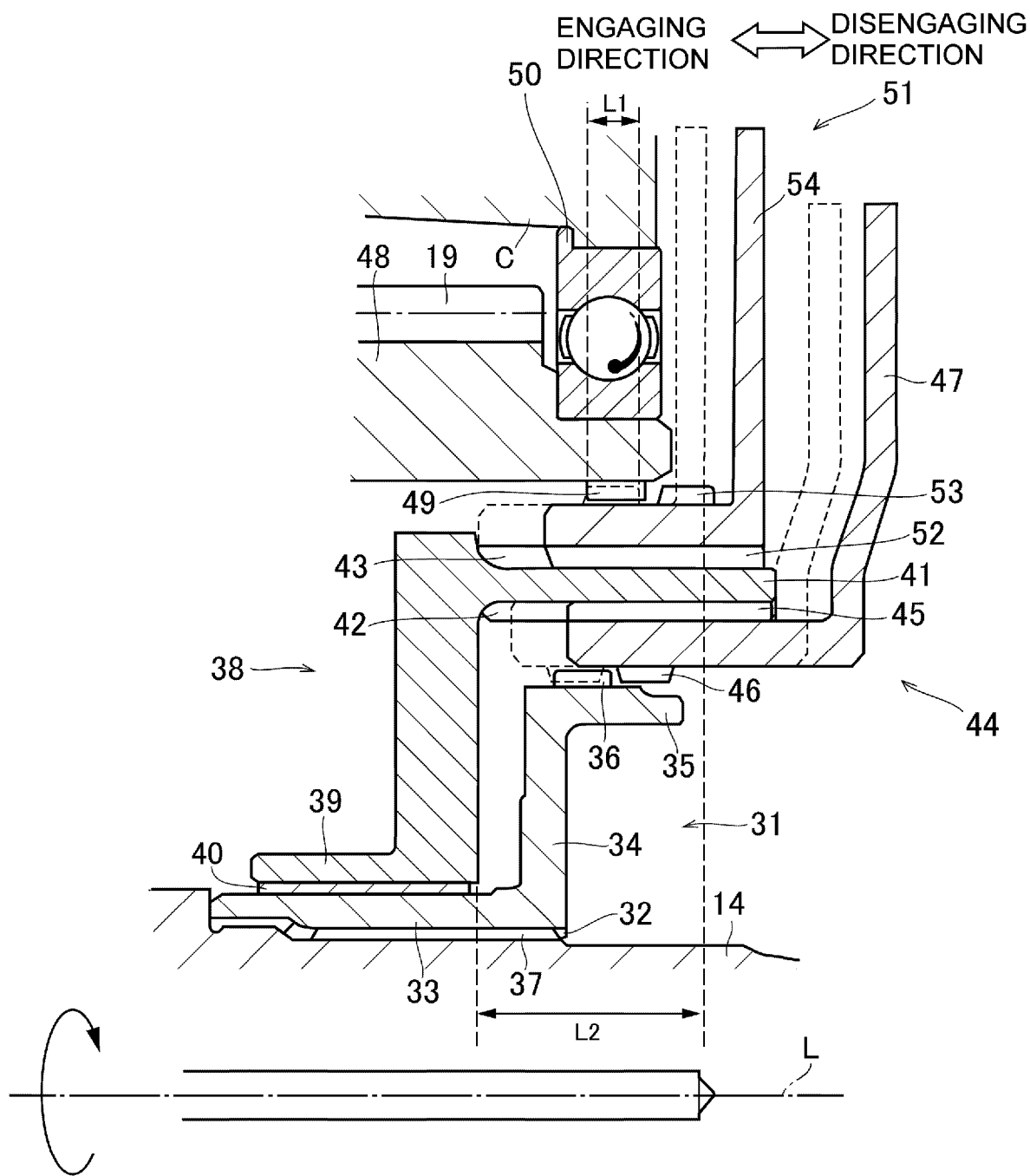
FIG. 9 is a cross-sectional view showing structures of a first clutch and a second clutch.

As illustrated in FIG. 9, a radially inner hub 31 is splined onto the input shaft 14. The radially inner hub 31 comprises: a diametrically smaller cylindrical portion 33; a set of spline teeth 32 formed on an inner circumferential surface of the diametrically smaller cylindrical portion 33; a flange portion 34 expanding around one end of the diametrically smaller cylindrical portion 33 closer to the engine 2; a diametrically larger cylindrical portion 35 protruding from an outer circumference of the flange portion 34 toward the engine 2; and a set of dog teeth 36 formed on an outer circumferential surface of the diametrically larger cylindrical portion 35. Specifically, the dog teeth 36 is formed on the outer circumferential surface of the diametrically larger cylindrical portion 35 at a portion closer to the flange portion 34, and each of the dog teeth 36 has a predetermined length in an axial direction L.

On the other hand, a set of spline teeth 37 is formed on an outer circumferential surface of the input shaft 14. The spline teeth 32 formed on the diametrically smaller cylindrical portion 33 of the radially inner hub 31 are meshed with the spline teeth 37 of the input shaft 14 so that the radially inner hub 31 is rotated integrally with the input shaft 14. A leading end of the diametrically smaller cylindrical portion 33 of the radially inner hub 31 is brought into contact to a stepped portion of the input shaft 14 so that the diametrically smaller cylindrical portion 33 is positioned by the stepped portion of the input shaft 14. Optionally, in order to prevent an axial displacement of the radially inner hub 31, a nut or the like may be fitted onto the input shaft 14 to fix an axial position of said one end of the diametrically smaller cylindrical portion 33.

The carrier 18 of the transmission section 8 comprises: a carrier plate 38 connected to the radially inner hub 31; another carrier plate (not shown) connected to the power split section 7; and a plurality of pinion shafts (not shown) extending between the carrier plate 38 and another carrier plate to support the pinion gear 17 respectively. The carrier plate 38 comprises: a diametrically smaller cylindrical portion 39 protruding from an inner circumference of the carrier plate 38 toward the power split section 7; a diametrically larger cylindrical portion 41 protruding from an outer circumference of the carrier plate 38 toward the engine 2; a set of inner spline teeth 42 formed on an inner circumferential surface of the diametrically larger cylindrical portion 41; and a set of outer spline teeth 43 formed on an outer circumferential surface of the diametrically larger cylindrical portion 41. The diametrically smaller cylindrical portion 39 of the carrier plate 38 is fitted onto the diametrically smaller cylindrical portion 33 of the radially inner hub 31 through a bush 40.

A cylindrical first movable member 44 is inserted between the diametrically larger cylindrical portion 35 of the radially inner hub 31 and the diametrically larger cylindrical portion 41 of the carrier plate 38. Specifically, a set of outer spline teeth 45 is formed on an outer circumferential surface of the first movable member 44, and the outer spline teeth 45 of the first movable member 44 is meshed with the inner spline teeth 42 formed on the diametrically larger cylindrical portion 41 of the carrier plate 38 so that the first movable member 44 is rotated together with the carrier plate 38. In addition, a set of dog teeth 46 is formed on an inner circumferential surface of the first movable member 44, and the dog teeth 46 is engaged with the dog teeth 36 formed on the diametrically larger cylindrical portion 35 of the radially inner hub 31 by moving the first movable member 44 toward the carrier plate 38. A length of each of the dog teeth 46 in the axial direction L may be identical to the axial lengths of the dog teeth 36 the radially inner hub 31. For example, the lengths of the dog teeth 36 and the dog teeth 46 may be set such that a stress acting between the dog teeth 36 and the dog teeth 46 is reduced less than an acceptable value, based on a maximum design value of transmission torque and the acceptable value of the stress acting between the dog teeth 36 and the dog teeth 46. Edges of the dog teeth 36 and the dog teeth 46 are individually chamfered so that the dog teeth 46 are allowed to be engaged smoothly with the dog teeth 36 even if the dog teeth 36 and the dog teeth 46 are in phase with each other in a rotational direction.

The first movable member 44 comprises a flange portion 47 expanding around one end of the first movable member 44 closer to the engine 2. The flange portion 47 of the first movable member 44 is connected to a shift fork and an actuator (neither of which are shown) so that a load is applied to the flange portion 47 from the actuator through the shift fork. For example, when the flange portion 47 of the first movable member 44 is pushed toward the carrier plate 38 (i.e., toward the left side in FIG. 9) by the actuator through the shift fork, the dog teeth 46 formed on the first movable member 44 is engaged with the dog teeth 36 formed on the diametrically larger cylindrical portion 35 of the radially inner hub 31. By contrast, when the flange portion 47 of the first movable member 44 is pulled away from the carrier plate 38 (i.e., toward the right side in FIG. 9) by the actuator through the shift fork, the dog teeth 46 formed on the first movable member 44 is disengaged from the dog teeth 36 formed on the diametrically larger cylindrical portion 35 of the radially inner hub 31. That is, the first clutch CL1 comprises the actuator, the shift fork, and the first movable member 44. Optionally, the flange portion 47 may also be formed separately from the first movable member 44. For example, the flange portion 47 may also be fitted into a slit formed on a leading end of the first movable member 44 of the engine 2 side so that the flange portion 47 is allowed to be rotated relatively to the first movable member 44. Further, the first movable member 44 may also be actuated by a rod (not shown) connected to the actuator instead of the flange portion 47.

The ring gear 16 of the transmission section 8 comprises a cylindrical portion 48 protruding toward the engine 2. Specifically, the cylindrical portion 48 of the ring gear 16 is situated concentrically around the diametrically larger cylindrical portion 41 of the carrier plate 38. That is, an internal diameter of the cylindrical portion 48 of the ring gear 16 is larger than an outer diameter of the diametrically larger cylindrical portion 41 of the carrier plate 38. A leading end of the cylindrical portion 48 of the ring gear 16 is situated further from the engine 2 than a leading end of the diametrically larger cylindrical portion 41 of the carrier plate 38, and a set of dog teeth 49 each of which has a predetermined length in the axial direction L is formed on an inner circumferential surface of the cylindrical portion 48. A ball bearing 50 is inserted into a clearance between an inner circumferential surface of a casing C of the power transmission unit 1 and a leading end section of the cylindrical portion 48 of the ring gear 16 so that the ring gear 16 is allowed to rotate relatively to the casing C.

A cylindrical second movable member 51 is inserted between the diametrically larger cylindrical portion 41 of the carrier plate 38 and the cylindrical portion 48 of the ring gear 16. Specifically, a set of inner spline teeth 52 is formed on an inner circumferential surface of the second movable member 51, and the inner spline teeth 52 is meshed with the outer spline teeth 43 formed on the diametrically larger cylindrical portion 41 of the carrier plate 38 so that the second movable member 51 is rotated together with the carrier plate 38. In addition, a set of dog teeth 53 is formed on an outer circumferential surface of the second movable member 51, and the dog teeth 53 is engaged with the dog teeth 49 formed on the cylindrical portion 48 of the ring gear 16 by moving the second movable member 51 toward the ring gear 16. A length of each of the dog teeth 53 in the axial direction L may be identical to the axial lengths of the dog teeth 49 of the cylindrical portion 48. The lengths of the dog teeth 49 and the dog teeth 53 are also set such that a stress acting between the dog teeth 49 and the dog teeth 53 is reduced less than an acceptable value, based on a maximum design value of transmission torque and the acceptable value of the stress acting between the dog teeth 49 and the dog teeth 53. Edges of the dog teeth 49 and the dog teeth 53 are individually chamfered so that the dog teeth 53 are allowed to be engaged smoothly with the dog teeth 49 even if the dog teeth 49 and the dog teeth 53 are in phase with each other in the rotational direction.

Accordingly, in the exemplary embodiment of the present disclosure, the second movable member 51 serves as a first rotary member, the cylindrical portion 48 of the ring gear 16 serves as a second rotary member, the diametrically larger cylindrical portion 41 of the carrier plate 38 serves as a third rotary member, and the driven gear 21 serves as a fourth rotary member. Further, in the exemplary embodiment of the present disclosure, the dog teeth 53 of the second movable member 51 serve as a first set of teeth, the inner spline teeth 52 of the second movable member 51 serve as a second set of teeth, the dog teeth 49 of the ring gear 16 serve as a third set of teeth, and the outer spline teeth 43 of the carrier plate 38 serve as a fourth set of teeth.

The second movable member 51 comprises a flange portion 54 expanding around one end of the second movable member 51 closer to the engine 2. The flange portion 54 of the second movable member 51 is connected to a shift fork and an actuator (neither of which are shown) so that a load is applied to the flange portion 54 from the actuator through the shift fork. For example, when the flange portion 54 of the second movable member 51 is pushed toward the cylindrical portion 48 of the ring gear 16 (i.e., toward the left side in FIG. 9) by the actuator through the shift fork, the dog teeth 53 formed on the second movable member 51 is engaged with the dog teeth 49 formed on the cylindrical portion 48 of the ring gear 16. By contrast, when the flange portion 54 of the second movable member 51 is pulled away from the cylindrical portion 48 of the ring gear 16 (i.e., toward the right side in FIG. 9) by the actuator through the shift fork, the dog teeth 53 formed on the second movable member 51 is disengaged from the dog teeth 49 formed on the cylindrical portion 48 of the ring gear 16. That is, the second clutch CL2 comprises the actuator, the shift fork, and the second movable member 51, and the flange portion 54 of the second movable member 51 serves as a pushing member of the embodiment.

Optionally, the flange portion 54 may also be formed separately from the second movable member 51. For example, the flange portion 54 may also be fitted into a slit formed on a leading end of the second movable member 51 of the engine 2 side so that the flange portion 51 is allowed to be rotated relatively to the second movable member 51. Further, the second movable member 51 may also be actuated by a rod (not shown) connected to the actuator instead of the flange portion 54.

Here will be explained an engagement of the second clutch CL2. As described, the dog teeth 53 of the second movable member 51 is engaged with the dog teeth 49 of the ring gear 16 when the second movable member 51 is pushed toward the ring gear 16, and the inner spline teeth 52 of the second movable member 51 is splined to the outer spline teeth 43 of the carrier plate 38. According to the exemplary embodiment of the present disclosure, a helical gear in which the teeth are set at a predetermined angle with respect to a rotational center axis is adopted as each of the above-explained gears of the power transmission unit 1. Therefore, when one of the output gear 19 connected to the ring gear 16 and the driven gear 21 meshing with each other is rotated, the output gear 19 and the driven gear 21 are isolated away from each other in both axial and radial directions by a reaction force. Consequently, the ring gear 16 is inclined to rotate eccentrically with respect to the carrier 18. In this situation, if the second movable member 51 is engaged with the cylindrical portion 48 of the ring gear 16, that is, if the second clutch CL2 is in engagement, an engagement load between the dog teeth 53 of the second movable member 51 and the dog teeth 49 of the ring gear 16 is changed. As a result, an engagement length between the dog teeth 53 of the second movable member 51 and the dog teeth 49 of the ring gear 16 is changed. In this situation, if the output gear 19 and the driven gear 21 meshing with each other are rotated continuously, the dog teeth 53 of the second movable member 51 may be disengaged unintentionally from the dog teeth 49 of the ring gear 16. In order to prevent such unintentional disengagement of the second clutch CL2, in the second movable member 51, a position of the dog teeth 53 is adjusted with respect to the inner spline teeth 52.

Figure 10:
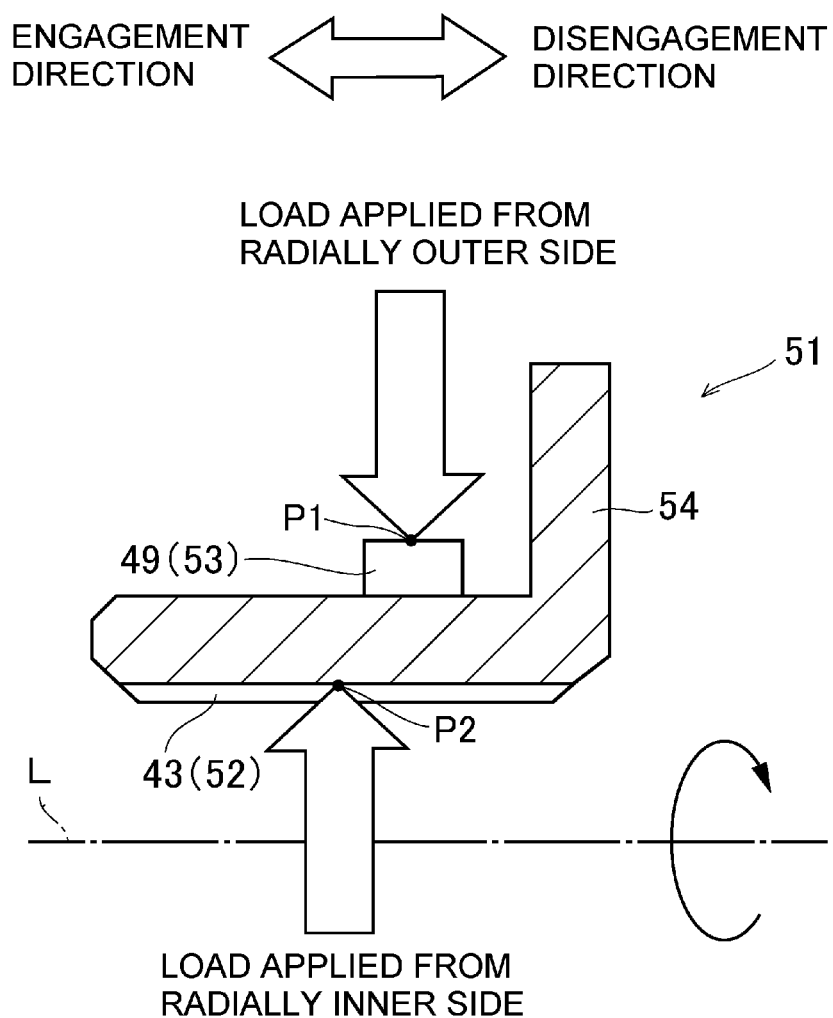
FIG. 10 is a cross-sectional view showing loads applied to the second clutch.

Turning to FIG. 10, there is shown a relative position between: an engagement position between the dog teeth 53 of the second movable member 51 and the dog teeth 49 of the ring gear 16; and an engagement position between the inner spline teeth 52 of the second movable member 51 and the outer spline teeth 43 of the carrier plate 38. As illustrated in FIG. 10, a center of engagement P1 between the dog teeth 53 of the second movable member 51 and the dog teeth 49 of the ring gear 16 is situated at a point withdrawn from a center of engagement P2 between the inner spline teeth 52 of the second movable member 51 and the outer spline teeth 43 of the carrier plate 38, in a direction to disengage the dog teeth 53 of the second movable member 51 from the dog teeth 49 of the ring gear 16. That is, the center of engagement P1 is situated in the right side of the center of engagement P2 in FIG. 10 in the direction to disengage the second clutch CL2. For example, the center of engagement P1 may be withdrawn from the center of engagement P2 in the direction to disengage the second clutch CL2 by forming the dog teeth 49 of the ring gear 16 on the inner circumferential surface of the cylindrical portion 48 of the ring gear 16 at a site withdrawn from the center of engagement P2 in the direction to disengage the second clutch CL2, and forming the dog teeth 53 on the outer circumferential surface of the second movable member 51 at a site to be engaged properly with the dog teeth 49 when the second movable member 51 is pushed toward the ring gear 16. Instead, the center of engagement P1 may also be withdrawn from the center of engagement P2 in the direction to disengage the second clutch CL2 by reducing the axial lengths of the inner spline teeth 52 of the second movable member 51 and the outer spline teeth 43 of the carrier plate 38.

Specifically, the center of engagement P1 is an intermediate point of an engagement length L1 between the dog teeth 53 of the second movable member 51 and the dog teeth 49 of the ring gear 16, and a strongest load is applied to the center of engagement P1 from radially outer side during operation of the power split mechanism 6 while engaging the second clutch CL2. Likewise, the center of engagement P2 is an intermediate point of an engagement length L2 between the inner spline teeth 52 of the second movable member 51 and the outer spline teeth 43 of the carrier plate 38, and a strongest load is applied to the center of engagement P2 from radially inner side during operation of the power split mechanism 6 while engaging the second clutch CL2. In the power split mechanism 6, therefore, the ring gear 16 is subjected to a moment to be inclined in a direction push the dog teeth 49 onto the dog teeth 53 of the second movable member 51 during operation of the power split mechanism 6 while engaging the second clutch CL2. For this reason, unintentional disengagement of the dog teeth 53 of the second movable member 51 from the dog teeth 49 of the ring gear 16 can be prevented. If the center of engagement P1 is situated further than the center of engagement P2 in the direction to engage the second clutch CL2 as the conventional art, the ring gear 16 will be inclined in the direction to isolate the dog teeth 49 of the ring gear 16 away from the dog teeth 53 of the second movable member 51 during operation of the power split mechanism 6 while engaging the second clutch CL2. As a result, the dog teeth 53 of the second movable member 51 may be disengaged unintentionally from the dog teeth 49 of the ring gear 16.

As described, sine the output gear 19 connected to the ring gear 16 and the driven gear 21 are helical gears, the ring gear 16 is inclined inevitably in a predetermined direction by the reaction force acting between the output gear 19 and the driven gear 21. Therefore, the inventors of the present application have found by experiment that unintentional disengagement of the second clutch CL2 can be prevented by adjusting the center of engagement P1 and the center of engagement P2 as shown in FIG. 10, while utilizing such inevitable inclination of the ring gear 16.

Thus, according to the exemplary embodiment of the present disclosure, unintentional disengagement of the second clutch CL2 can be prevented without requiring an additional member such as an actuator. Optionally, if the reaction force acting between e.g., the output gear 19 and the driven gear 21 is large, a top of each of the dog teeth may be shaped into an inverse tapered shape to prevent unintentional disengagement of the second clutch CL2.

Although the above exemplary embodiments of the present disclosure have been described, it will be understood by those skilled in the art that the present disclosure should not be limited to the described exemplary embodiments, and various changes and modifications can be made within the scope of the present disclosure. For example, the above-mentioned relative position between the center of engagement P1 and the center of engagement P2 may be effective to prevent unintentional disengagement of the second clutch CL2 irrespective of a rotational direction of the second clutch CL2.

What is claimed is:

1. A power transmission unit comprising:
   a cylindrical first rotary member;
   a cylindrical second rotary member that is diametrically larger than the first rotary member, and that is arranged concentrically with the first rotary member;
   a cylindrical third rotary member that is diametrically smaller than the first rotary member, and that is arranged concentrically with the first rotary member;
   a first engagement device including the second rotary member;
   a first set of teeth that is formed on an outer circumferential surface of the first rotary member;
   a second set of teeth that is formed on an inner circumferential surface of the first rotary member;
   a third set of teeth that is formed on an inner circumferential surface of the second rotary member to be meshed with the first set of teeth; and
   a fourth set of teeth that is formed on an outer circumferential surface of the third rotary member to be meshed with the second set of teeth;
   wherein the first rotary member is reciprocated in an axial direction to engage and disengage the first set of teeth to/from the third set of teeth thereby engaging and disengaging the first engagement device, and
   a center of engagement between the first set of teeth and the third set of teeth is situated at a point withdrawn from a center of engagement between the second set of teeth and the fourth set of teeth in a direction to disengage the first set of teeth from the third set of teeth.

2. The power transmission unit as claimed in claim 1, wherein the second rotary member is connected to a fourth rotary member mounted on a shaft other than a shaft of the second rotary member in a torque transmittable manner.

3. The power transmission unit as claimed in claim 1, wherein the second rotary member is rotatably supported by a bearing interposed between a casing of the power transmission unit and the second rotary member.

4. The power transmission unit as claimed in claim 1, wherein the first rotary member includes a pushing member expanding from one end of the first rotary member, and the first set of teeth is engaged with the third set of teeth by pushing the first rotary member by the pushing member.

5. The power transmission unit as claimed in claim 1, wherein the first rotary member and the third rotary member are always engaged with each other to rotate integrally.

6. The power transmission unit as claimed in claim 1, wherein a prime mover of the power transmission unit comprises an engine, a first motor, and a second motor, the power transmission unit further comprises:
   a first differential mechanism that performs a differential action among a first rotary element that is connected to the engine, a second rotary element that is connected to the first motor, and a third rotary element that delivers torque to drive wheels; and
   a second differential mechanism that performs a differential action among a fourth rotary element that is connected to the second motor, a fifth rotary element that is connected to the third rotary element, and a sixth rotary element,
the second rotary member is rotated integrally with the fourth rotary element,
the third rotary member is rotated integrally with the sixth rotary element, and
the first engagement device selectively connects the fourth rotary element to the sixth rotary element.

7. The power transmission unit as claimed in claim 6, further comprising:
   an input member;
   an output member that outputs torque delivered from the input member; and
   a second engagement device that selectively connects the sixth rotary element to the first rotary element,
   the first engagement device is engaged to establish a first continuously variable mode in which a speed ratio between the input member and the output member can be varied continuously, and
   the second engagement device is engaged to establish a second continuously variable mode in which a speed ratio between the input member and the output member can be varied continuously, and in which a torque amplification factor is different from the first continuously variable mode.

\* \* \* \* \*